(12) United States Patent
Ashiba et al.

(10) Patent No.: US 8,991,570 B2
(45) Date of Patent: Mar. 31, 2015

(54) CYLINDER APPARATUS

(75) Inventors: Masahiro Ashiba, Naka-gun (JP);
Tadashi Yoshida, Ebina (JP)

(73) Assignee: Hitachi Automotive Systems, Ltd., Hitachinaka-Shi (JP)

( * ) Notice: Subject to any disclaimer, the term of this patent is extended or adjusted under 35 U.S.C. 154(b) by 460 days.

(21) Appl. No.: 13/560,009

(22) Filed: Jul. 27, 2012

(65) Prior Publication Data

US 2013/0025446 A1    Jan. 31, 2013

(30) Foreign Application Priority Data

Jul. 27, 2011    (JP) ................................ P2011-164363

(51) Int. Cl.
*F16F 9/56* (2006.01)
*F16F 1/18* (2006.01)
*F16F 9/348* (2006.01)

(52) U.S. Cl.
CPC .................................. *F16F 9/3485* (2013.01)
USPC ...................... 188/282.8; 188/282.9; 267/163

(58) Field of Classification Search
USPC ..................... 188/282.5, 282.6, 282.8, 282.9; 267/159–164
See application file for complete search history.

(56) References Cited

U.S. PATENT DOCUMENTS

| 5,085,300 | A | * | 2/1992 | Kato et al. | ................. | 188/282.6 |
| 8,333,270 | B2 | * | 12/2012 | Ji et al. | ...................... | 188/322.15 |
| 8,517,153 | B2 | * | 8/2013 | Baltes | ......................... | 188/282.6 |
| 2006/0185948 | A1 | * | 8/2006 | Schmitt | ..................... | 188/282.5 |

FOREIGN PATENT DOCUMENTS

JP    4-34566    3/1992

* cited by examiner

*Primary Examiner* — Christopher Schwartz
(74) *Attorney, Agent, or Firm* — Nixon & Vanderhye P.C.

(57) ABSTRACT

A cylinder apparatus includes a flow path which is provided in a valve member and through which a fluid circulates when a rod is moved; a disk valve which opens and closes the flow path; and a spring member which presses the disk valve in an axial direction. The spring member includes a first spring which comes into contact with the disk valve in a state in which the disk valve closes the flow path, and a second spring which comes into contact with the disk valve in a state in which the disk valve opens the flow path.

15 Claims, 6 Drawing Sheets

CYLINDER APPARATUS

BACKGROUND OF THE INVENTION

1. Field of the Invention

The present invention relates to a cylinder apparatus.

Priority is claimed on Japanese Patent Application No. 2011-164363 filed on Jul. 27, 2011, the content of which is incorporated herein by reference.

2. Description of Related Art

In a cylinder apparatus, a structure in which a disk valve that opens and closes a flow path formed in the valve is pressed by a spring has been known (Japanese Unexamined Utility Model Application, First Publication No. H4-34566).

In the cylinder apparatus, it is required to promote optimization of valve properties.

SUMMARY OF THE INVENTION

The present invention provides a cylinder apparatus that is capable of promoting optimization of valve properties.

According to a first aspect of the present invention, a cylinder apparatus includes a cylinder in which a fluid is enclosed; a valve member which is fitted in the cylinder and divides the inside of the cylinder into at least two chambers; a rod, an end of which extends to the outside of the cylinder; a flow path which is provided in the valve member and through which the fluid circulates when the rod is moved; a valve which opens and closes the flow path; and a spring member which presses the valve in an axial direction. The spring member includes a first spring which comes into contact with a disk valve in a state in which the disk valve closes the flow path, and a second spring which comes into contact with the disk valve in a state in which the disk valve opens the flow path.

According to a second aspect of the present invention, the spring member is a plate-like spring which includes a plurality of elastic legs in a circumferential direction that are bent toward the valve. Some of the plurality of the elastic legs constitutes the first spring, and others of the plurality of the elastic legs constitute the second spring.

According to a third aspect of the present invention, the spring member is constituted by one plate-like spring. The first spring has a flexural angle toward the valve that is greater than that of the second spring.

According to a fourth aspect of the present invention, the spring member is constituted by one plate-like spring. The first spring and the second spring have the same flexural angle toward the valve. A length of the first spring is greater than that of the second spring.

A spring constant of the second spring may be greater than that of the first spring.

A width of the second spring may be greater than that of the first spring.

According to a fifth aspect of the present invention, the first spring is constituted by a plate-like spring including a plurality of elastic legs in a circumferential direction that are bent toward the valve. The second spring is constituted by a plate-like spring including a plurality of elastic legs in a circumferential direction that are bent toward the valve. The spring member is constituted by overlapping the first spring and the second spring.

According to a sixth aspect of the present invention, the first spring is constituted by a coil spring. The second spring is constituted by a plate-like spring including a plurality of elastic legs in a circumferential direction that are bent toward the valve.

The valve member may constitute a piston that is fastened to the other end of the rod.

The valve member may constitute a base valve.

The spring member may be clamped to the valve member.

Both of an inner periphery and an outer periphery of the valve may be lifted.

The valve may be a check valve that is opened when a piston speed is equal to or less than at least 0.05 m/s.

The valve may be a check valve which does not generate a substantial damping force.

The valve may be a disk valve.

According to the cylinder apparatus mentioned above, it is possible to promote optimization of valve properties.

DETAILED DESCRIPTION OF THE INVENTION

First Embodiment

A shock absorber which is a cylinder apparatus according to a first embodiment of the present invention will be described below with reference to FIGS. 1 to 4.

Figure 1:
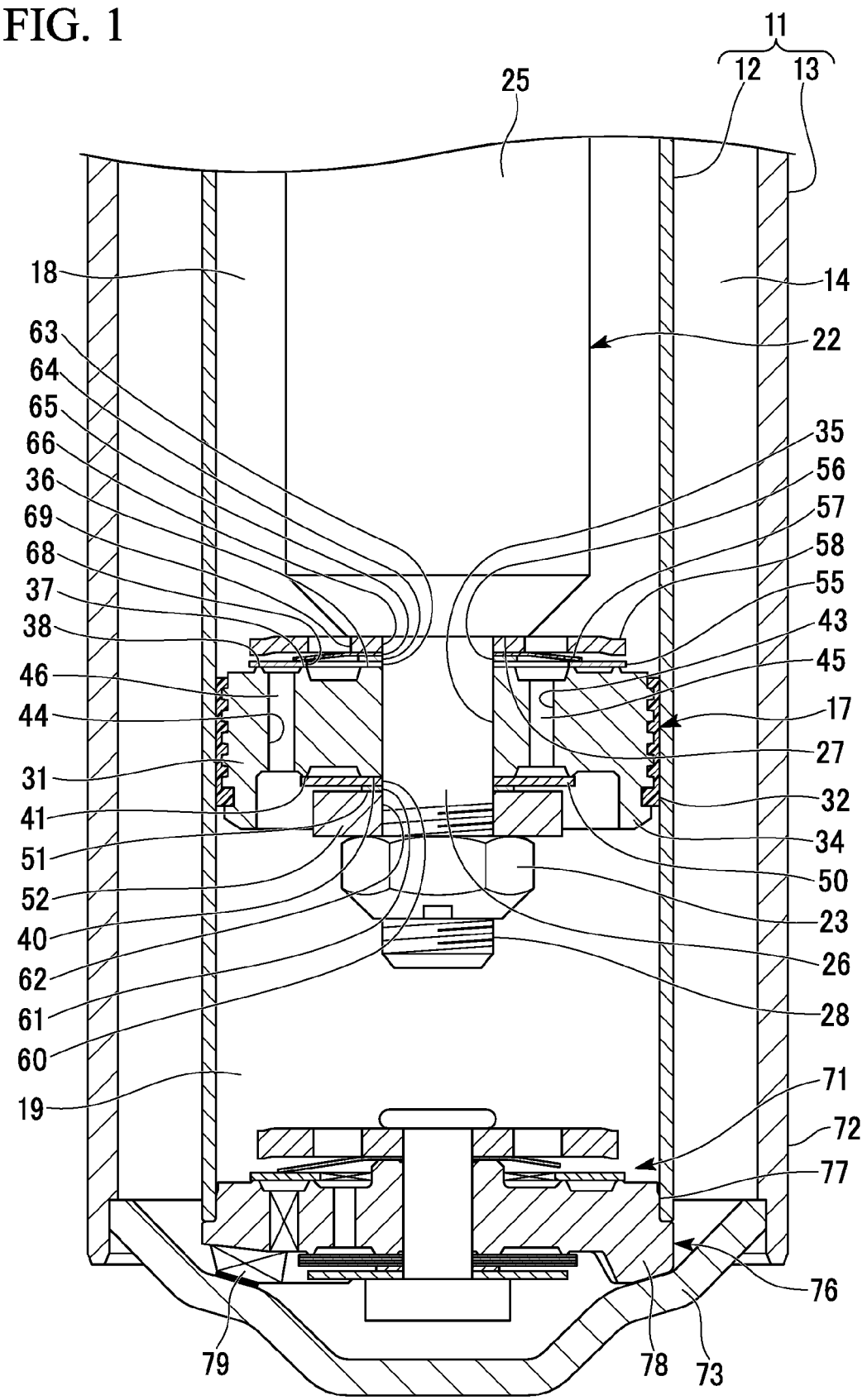
FIG. 1 is a cross-sectional view showing a lower part of a shock absorber which is a cylinder apparatus according to a first embodiment of the present invention.

As shown in FIG. 1, the shock absorber of the first embodiment has a cylinder 11 in which a fluid such as a liquid or gas is enclosed. The cylinder 11 has an internal cylinder 12, and an external cylinder 13 that has a diameter greater than that of the internal cylinder 12 and is provided concentrically therewith so as to cover the internal cylinder 12. The cylinder 11 has a double cylinder structure in which a reservoir chamber 14 is formed between the internal cylinder 12 and the external cylinder 13.

A piston 17 is slidably fitted into the internal cylinder 12 of the cylinder 11. The piston 17 defines an upper chamber 18 and a lower chamber 19 in the internal cylinder 12, that is, in the cylinder 11. Specifically, in the cylinder 11, a hydraulic fluid is enclosed as the fluid in the upper chamber 18 and the lower chamber 19, and hydraulic fluid and a gas are enclosed as the fluid in the reservoir chamber 14.

In the cylinder 11, the other end of a rod 22 having an end extending to the outside of the cylinder 11 is inserted into the internal cylinder 12. The piston 17 is fastened to the other end of the rod 22 in the internal cylinder 12 using a nut 23. Although it is not shown, the one end side of the rod 22 is inserted into a rod guide and an oil seal mounted to upper end portions of the internal cylinder 12 and the external cylinder 13 and extends to the outside.

The rod 22 has a main shaft section 25 and an attachment shaft section 26 having a diameter smaller than that of the main shaft section 25 in the end portion of the inside of the cylinder 11. Accordingly, the main shaft section 25 is formed with a step surface 27 along the end portion of the attachment shaft section 26 in a shaft orthogonal direction. The attachment shaft section 26 is formed with a male screw 28 which screws a nut 23 in a predetermined range of a side opposite to the main shaft section 25.

The piston 17 has a piston valve member 31 and a sliding contact member 32. The piston valve member 31 has a substantially disc-like shape. The piston valve member 31 is inserted into the cylinder 11 and divides the inside of the cylinder 11 into two chambers of the upper chamber 18 and the lower chamber 19. The sliding contact member 32 is mounted to the outer peripheral surface of the piston valve member 31 and comes into slide-contact with the inside of the internal cylinder 12. The piston valve member 31 is formed with a cylindrical protrusion section 34 axially protruding on the outer periphery side of the lower chamber 19 side thereof.

In the piston valve member 31, a rod insertion hole 35 is formed to axially penetrate the center in the radial direction. Furthermore, the piston valve member 31 is formed with an annular upper attachment boss section 36, an annular internal sheet section 37, and an annular external sheet section 38 at a side opposite to the cylindrical protrusion section 34 in the axial direction. The upper attachment boss section 36 protrudes in the axial direction at outside of the rod insertion hole 35 in the radial direction. The internal sheet section 37 protrudes in the axial direction at outside of the upper attachment boss section 36 in the radial direction. The external sheet section 38 protrudes in the axial direction at outside of internal sheet section 37 in the radial direction. In addition, the piston valve member 31 is formed with an annular lower attachment boss section 40 and an annular sheet section 41 on the cylindrical protrusion section 34 side in the axial direction. The lower attachment boss section 40 protrudes in the axial direction at outside of the rod insertion hole 35 in the radial direction. The sheet section 41 protrudes in the axial direction at outside of the lower attachment boss section 40 and inside of the cylindrical protrusion section 34 in the radial direction.

In the axial direction of the piston valve member 31, heights of the upper attachment boss section 36, the internal sheet section 37 and the external sheet section 38 coincide. A height of the sheet section 41 in a protrusion direction is slightly higher than that of the lower attachment boss section 40.

The piston valve member 31 is formed with a plurality of axially penetrating flow path holes 43 (in FIG. 1, only one is shown in the cross-sectional view) at intervals in the circumferential direction. The flow path holes 43 are configured so that one ends thereof in the axial direction are opened between the upper attachment boss section 36 and the internal sheet section 37, and the other ends thereof are opened between the lower attachment boss section 40 and the sheet section 41. Furthermore, the piston valve member 31 is formed with a plurality of axially penetrating flow path holes 44 (in FIG. 1, only one is shown in the cross-sectional view) at intervals in the circumferential direction. The flow path holes 44 are configured so that one ends thereof in the axial direction are opened between the internal sheet section 37 and external sheet section 38, and the other ends thereof are opened between the sheet section 41 and the cylindrical protrusion section 34.

The internal flow path hole 43 forms one flow path 45 through which the hydraulic fluid circulates between the upper chamber 18 and the lower chamber 19. The external flow path 44 forms the other flow path 46 through which the hydraulic fluid circulates between the upper chamber 18 and the lower chamber 19.

The piston 17 has a disk valve 50, a spacer 51 and a valve restricting member 52 sequentially from the piston valve member 31 side at the cylindrical protrusion section 34 side of the piston valve member 31 in the axial direction. Furthermore, the piston 17 has a disk valve 55, a spacer 56, a spring member 57, and a valve restricting member 58 sequentially from the piston valve member 31 side at a side opposite to the cylindrical protrusion section 34 of the piston valve member 31 in the axial direction.

A rod insertion hole 60 is formed so as to axially penetrate the center of the disk valve 50 in the radial direction. A rod insertion hole 61 is formed so as to axially penetrate the center of the spacer 51 in the radial direction. A rod insertion hole 62 is formed so as to axially penetrate the center of the valve restricting member 52 in the radial direction. The attachment shaft section 26 of the rod 22 is inserted into the rod insertion hole 60 of the disk valve 50. The attachment shaft section 26 of the rod 22 is inserted in to the rod insertion hole 61 of the spacer 51. The attachment shaft section 26 of the rod 22 is inserted into the rod insertion hole 62 of the valve restricting member 52. In this state, the inner peripheral side is clamped by the nut 23 and the piston valve member 31.

A rod insertion hole 63 is formed so as to axially penetrate the center of the disk valve 55 in the radial direction. A rod insertion hole 64 is formed so as to axially penetrate the center of the spacer 56 in the radial direction. A rod insertion hole 65 is formed so as to axially penetrate the center of the spring member 57 in the radial direction. A rod insertion hole 66 is formed so as to axially penetrate the center of the valve restricting member 58 in the radial direction. The attachment shaft section 26 of the rod 22 is inserted into the rod insertion hole 63 of the disk valve 55. The attachment shaft section 26 of the rod 22 is inserted into the rod insertion hole 64 of the spacer 56. The attachment shaft section 26 of the rod 22 is inserted into the rod insertion hole 65 of the spring member 57. The attachment shaft section 26 of the rod 22 is inserted into the rod insertion hole 66 of the valve restricting member 58. In this state, the inner peripheral side is clamped by the piston valve member 31 and the step surface 27 of the main shaft section 25 of the rod 22.

The disk valve 50 of the lower chamber 19 side has an outer diameter that is slightly greater than that of the sheet section 41. The disk valve 50 comes into contact with the lower attachment boss section 40 of the piston valve member 31 and the sheet section 41 to close the internal flow path 45. Moreover, when the rod 22 is moved to an extension side increasing protrusion quantity protruding from the inside of the cylinder 11, the disk valve 50 is separated from the sheet section 41 to open the flow path 45. Accordingly, in the internal flow path 45 provided in the piston valve member 31, when the rod 22 is moved to the extension side, the fluid circulates from the upper chamber 18 toward the lower chamber 19. The disk valve 50 constitutes a disk valve of the extension side opening and closing the flow path 45.

An outer diameter of the spacer 51 is smaller than that of the disk valve 50, and is substantially the same as that of the lower attachment boss section 40. An outer diameter of the valve restricting member 52 is greater than that of the spacer 51, and is slightly smaller than that of the disk valve 50. When the disk valve 50 is deformed in a direction away from the sheet section 41 by a predetermined amount, the valve restricting member 52 comes into contact with the disk valve 50 to restrict further deformation.

An outer diameter of the disk valve 55 of the upper chamber 18 side is slightly greater than that of the external sheet section 38 of the piston valve member 31. The disk valve 55 is formed with a cutout section 68 at a radially inner side thereof farther than a position that is in contact with the internal sheet section 37. The disk valve 55 always causes the internal flow path 45 to communicate with the upper chamber 18 via the cutout section 68.

The disk valve 55 comes into contact with the upper attachment boss section 36, the internal sheet section 37 and the external sheet section 38 of the piston valve member 31 to close the external flow path 46. Moreover, when the rod 22 is moved to a compression side increasing an approaching quantity to the cylinder 11, the disk valve 55 is separated from the external sheet section 38 to open the external flow path 46. Accordingly, in the external flow path 46 provided in the piston valve member 31, when the rod 22 is moved to the compression side, the fluid circulates from the lower chamber 19 toward the upper chamber 18. The disk valve 55 constitutes the disk valve of the compression side that opens and closes the flow path 46.

The spring member 57 comes into contact with the disk valve 55, presses the disk valve 55 in the axial direction, and causes the disk valve 55 to come into contact with the piston valve member 31. The outer diameter of the valve restricting member 58 is substantially the same as that of the disk valve 55. The valve restricting member 58 is formed with a plurality of through holes 69 causing the internal flow path 45 always to communicate with the upper chamber 18 via the cutout section 68 at intervals in the circumferential direction so as to axially penetrate the valve restricting member 58. When the disk valve 55 is deformed in a direction away from the external sheet section 38 by a predetermined quantity, the valve restricting member 58 abuts the disk valve 55 to restrict further deformation.

The external cylinder 13 includes a cylinder-shaped cylindrical member 72 and a bottom cover member 73 that is fitted to a lower end of the cylindrical member 72 to block the opening section of the lower end. The outer peripheral portion of the bottom cover member 73 is fitted to the inner peripheral portion of the cylindrical member 72. In this state, the bottom cover member 73 forms a step shape so as to be located at the outside as approaching to the central side. The bottom cover member 73 is fixed to the cylindrical member 72 in a sealed state by welding.

A base valve 71 is provided in the lower end portion of the internal cylinder 12. The base valve 71 defines the lower chamber 19 and the reservoir chamber 14 mentioned above in the cylinder 11. The base valve 71 has an attenuation valve which generates a damping force of the compression side, and a suction valve which causes oil liquid to flow from the reservoir chamber 14 to the cylinder without generating a substantial damping force at the extension side.

The base valve 71 has a substantially disc-like base valve member (valve member) 76 which is fitted in the cylinder 11 and divides the inside of the cylinder 11 into two chambers of the lower chamber 19 and the reservoir chamber 14. In the outer peripheral portion of the upper portion of the base valve member 76, a step section 77 having a diameter smaller than that of the lower portion thereof is formed. The base valve member 76 is fitted to the inner peripheral portion of the lower end of the internal cylinder 12 in the step section 77. Furthermore, the base valve member 76 has a ring-shaped projecting foot section 78 axially projecting at the outer peripheral side of the lower portion thereof. The base valve member 76 comes into contact with the bottom cover member 73 in the projecting foot section 78. The projecting foot section 78 is formed with a plurality (in FIG. 1, only one is shown in the cross-sectional view) of radially penetrating flow path grooves 79 at intervals in the circumferential direction. The range from between the internal cylinder 12 and the external cylinder 13 to between the base valve 71 and the bottom cover member 73 constitutes the reservoir chamber 14 by means of the flow path grooves 79.

Figure 2:
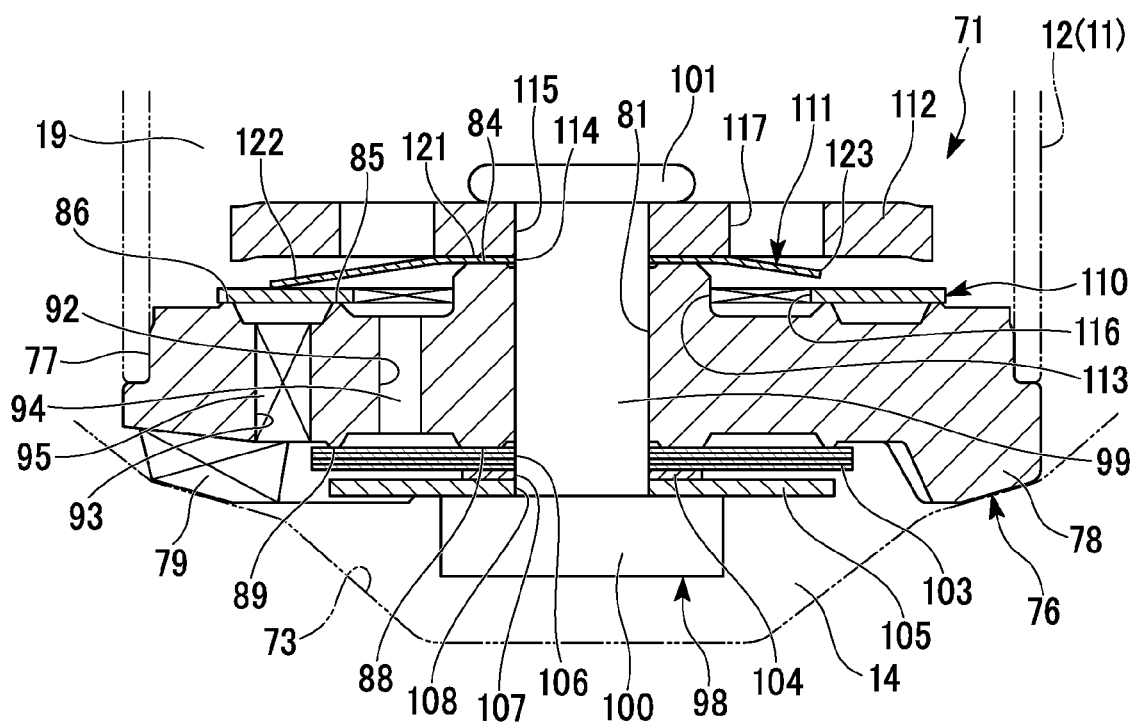
FIG. 2 is a cross-sectional view showing a base valve of the shock absorber which is the cylinder apparatus according to the first embodiment of the present invention.

As shown in FIG. 2, in the center of the base valve member 76 in the radial direction, a pin insertion hole 81 is formed so as to axially penetrate. Furthermore, on the side of the base valve member 76 opposite to the projecting foot section 78 in the axial direction, a cylindrical guide boss section 84, an annular internal sheet section 85, and an annular external sheet section 86 are formed. The guide boss section 84 is projected in the axial direction at outside of the pin insertion hole 81 in the radial direction. The internal sheet section 85 is projected in the axial direction at outside of the guide boss section 84 in the radial direction. The external sheet section 86 is projected in the axial direction at outside of the internal sheet section 85 in the radial direction. In addition, at the projecting foot section 78 side of the base valve member 76 in the radial direction, an annular lower attachment boss section 88, and an annular sheet section 89 are formed. The lower attachment boss section 88 is projected in the axial direction at outside of the pin insertion hole 81 in the radial direction. The sheet section 89 is projected further to the outside of the lower attachment boss section 88 in the radial direction and further to the inside of the projecting foot section 78 in the axial direction.

Here, in the axial direction of the base valve member 76, the height positions of the internal sheet section 85 and the external sheet section 86 coincide. The height position of the guide boss section 84 in the projection direction is slightly higher than the internal sheet section 85 and the external sheet section 86. Furthermore, the height of the sheet section 89 in the projection direction is slightly higher than that of the lower attachment boss section 88.

The base valve member 76 is formed with a plurality (only one is shown in the cross-sectional view of FIG. 2) of axially penetrating flow path holes 92 at intervals in the circumferential direction. An end of the flow path hole 92 in the axial direction opens between the guide boss section 84 and the internal sheet section 85, and the other end thereof opens between the lower attachment boss section 88 and the sheet section 89 to axially penetrate. Furthermore, the base valve member 76 is formed with a plurality (only one is shown in the cross-sectional view of FIG. 2) of axially penetrating flow path holes 93 at intervals in the circumferential direction. An end of the flow path hole 93 in the axial direction opens between the internal sheet section 85 and the external sheet section 86, and the other end thereof opens to a farther opposite side of the lower attachment boss section 88 than the sheet section 89. The external flow path hole 93 is formed so that a part thereof is connected to the flow path groove 79 of the projecting foot section 78.

The internal flow path hole 92 forms one flow path 94 which causes a hydraulic fluid to circulate between the lower chamber 19 and the reservoir chamber 14. The external flow path hole 93 forms the other flow path 95 which causes the hydraulic fluid to circulate between the lower chamber 19 and the reservoir chamber 14.

The base valve 71 has an attachment pin 98. The attachment pin 98 has a shaft section 99 which is inserted into the pin insertion hole 81 of the base valve member 76, and a head section 100 which is provided on one end of the shaft section 99 and has a greater diameter than the shaft section 99. In addition, in the other end of the shaft section 99 at side opposite to the head section 100, a swage section 101 having a diameter greater than that of the shaft section 99 is formed by swaging.

The base valve 71 has a disk valve 103 acting as an attenuation valve, a spacer 104, and a valve restricting member 105 sequentially from the base valve member 76 side at the projection foot section 78 side of the base valve member 76 in the axial direction. Furthermore, the base valve 71 has a disk valve 110 acting as a suction valve, a spring member 111, and a valve restricting member 112 sequentially from the base valve member 76 side at an opposite side of the projection foot section 78 of the base valve member 76 in the axial direction.

A pin insertion hole 106 is formed so as to axially penetrate the center of the disk valve 103 in the radial direction. A pin insertion hole 107 is formed so as to axially penetrate the center of the spacer 104 in the radial direction. A pin insertion hole 108 is formed so as to axially penetrate the center of the valve restricting member 105 in the radial direction. The disk valve 103, the spacer 104, and the valve restricting member 105 are configured so that the shaft section 99 of the attachment pin 98 is inserted into the pin insertion hole 106, the pin insertion hole 107 and the pin insertion hole 108. In this state, the inner peripheral side is clamped by the head section 100 of the attachment pin 98 and the base valve member 76.

A guide hole 113 is formed so as to axially penetrate the center of the disk valve 110 in the radial direction. The guide boss section 84 of the base valve member 76 is inserted into the guide hole 113 in the disk valve 110. The disk valve 110 is capable of being axially moved by the guidance of the guide boss section 84.

A pin insertion hole 114 is formed so as to axially penetrate the center of the spring member 111 in the radial direction. A pin insertion hole 115 is formed so as to axially penetrate the center of valve restricting member 112 in the radial direction. The spring member 111 and the valve restricting member 112 are configured so that the shaft section 99 of the attachment pin 98 is inserted into the pin insertion hole 114 and the pin insertion hole 115. In this state, the inner peripheral sides of the spring member 111 and the valve restricting member 112 are clamped by the base valve member 76 and the swage section 101 of the attachment pin 98.

The disk valve 103 of the reservoir chamber 14 side is configured so that a plurality of porous disks having the same outer diameters axially overlaps. The outer diameter of the disk valve 103 is slightly greater than that of the sheet section 89. The disk valve 103 comes into contact with the sheet section 89 and the lower attachment boss section 88 of the base valve member 76 to close the internal flow path 94. Moreover, when the rod 22 shown in FIG. 1 is moved to the compression side, the piston 17 is moved to the lower chamber 19 side and pressure of the lower chamber 19 rises, the disk valve 103 is separated from the sheet section 89 shown in FIG. 2 to open the internal flow path 94. Accordingly, in the internal flow path 94 provided in the base valve member 76, when the rod 22 is moved to the compression side, the fluid circulates from the lower chamber 19 toward the reservoir chamber 14. The disk valve 103 constitutes a disk valve of the compression side which opens and closes the flow path 94 and generates a damping force. In addition, the disk valve 103 has a function of causing the fluid to flow from the lower chamber 19 to the reservoir chamber 14 so as to discharge the surplus of the fluid generated by the rod 22 entering the cylinder 11, based on the relationship with the disk valve 55 of the compression side provided in the piston 17. In addition, the disk valve of the compression side may be a relief valve which relives pressure when the internal pressure of the cylinder is increased.

The outer diameter of the spacer 104 is smaller than that of the disk valve 103 and is substantially the same as that of the lower attachment boss section 88. The outer diameter of the valve restricting member 105 is slightly smaller than that of the disk valve 103 and is substantially the same as that of the sheet section 89. When the disk valve 103 is deformed in a direction away from the sheet section 89 by a predetermined quantity, the valve restricting member 105 comes into contact with the disk valve 103 to restrict the further deformation.

The outer diameter of the disk valve 110 of the lower chamber 19 side is slightly greater than that of the external sheet section 86. The disk valve 110 is formed with a plurality of cutout sections 116 at a radially inner side thereof farther than a position that is in contact with the internal sheet section 85 at intervals in the circumferential direction. The cutout sections 116 cause the internal flow path 94 always to communicate with the lower chamber 19. As mentioned above, the disk valve 110 is configured so as to be guided to the base valve member 76 by the guide boss section 84 and so as to be able to be axially moved. That is, both of the inner periphery and the outer periphery of the disk valve 110 are lifted to the base valve member 76.

The disk valve 110 comes into contact with the internal sheet section 85 and the external sheet section 86 of the base valve member 76 to close the external flow path 95. Moreover, when the rod 22 shown in FIG. 1 is moved to the extension side, the piston 17 is moved to the upper chamber 18 side and pressure of the lower chamber 19 decreases, the disk valve 110 is moved along the guide boss section 84, and is separated from the external sheet section 86 and the internal sheet section 85 to open the flow path 95. Accordingly, in the external flow path 95 provided in the base valve member 76, when the rod 22 is moved to the extension side, the fluid circulates from the reservoir chamber 14 toward the lower chamber 19. The disk valve 110 constitutes the disk valve of the extension side which opens and closes the flow path 95. In addition, the disk valve 110 has a function of causing the fluid to flow from the reservoir chamber 14 to the lower chamber 19 without substantial resistance (so that a damping force does not occur) so as to supplement the deficit of liquid due to the projection of the rod 22 from the cylinder 11, based on the relationship with the disk valve 50 of the extension side provided in the piston 17.

The spring member 111 comes into contact with the disk valve 110, presses the disk valve 110 in the axial direction, and causes the disk valve 110 to come into contact with the base valve member 76. The outer diameter of the valve restricting member 112 is slightly smaller than that of the disk valve 110 and is substantially the same as that of the external sheet section 86. The valve restricting member 112 is formed with a plurality of axially penetrating through holes 117 at intervals in the circumferential direction. The through holes 117 cause the internal flow path 94 to always communicate with the lower chamber 19 via the cutout section 116. When the disk valve 110 is lifted in a direction away from the internal sheet section 85 and the external sheet section 86 by a predetermined quantity, the valve restricting member 112 comes into contact with the disk valve 110 to restrict further lifting.

As shown in FIG. 3, the spring member 111 is a plate-like spring that is constituted by a base 121, an elastic leg (a first spring) 122 and an elastic leg (a second spring) 123. The base 121 has a flat disc-like shape formed with a circular pin insertion hole 114 in the center thereof. The elastic leg 122 extends radially outward from the outer peripheral portion of the base 121. The elastic leg 122 is provided in a plural number. The elastic leg 123 extends radially outward from the outer peripheral portion of the base 121. The elastic leg 123 is provided in a plural number. The elastic legs 122 and the elastic legs 123, which are different from the elastic legs 122, may each be provided in three or more locations. Herein, they are each provided in three locations. That is, the same numbers of the elastic legs 122 and the elastic legs 123 are provided.

The same numbers of the elastic legs 122 are always formed so as to be placed between two elastic legs 123 of the base 121 adjacent to each other in the circumferential direction. The same numbers of the elastic legs 123 are always formed so as to be placed between two elastic legs 122 of the base 121 adjacent to each other in the circumferential direction. Specifically, one elastic leg 122 is formed so as to be always placed in the center between two elastic legs 123 of the base 121 adjacent to each other in the circumferential direction. One elastic leg 123 is also formed so as to be always placed in the center between two elastic legs 122 of the base 121 adjacent to each other in the circumferential direction. As a consequence, one elastic leg 122 and one elastic leg 123 are alternately placed on the base 121, that is, in the circumferential direction of the spring member 111.

The elastic leg 122 forms a flat plate shape when in the natural state. When viewed from the radial direction of the base 121, as shown in FIG. 3B, the elastic leg 122 faces the base 121 and extends in a tilted shape at an obtuse angle so as to be positioned at one side in the axial direction outward from the base 121 in the radial direction.

Figure 3A:
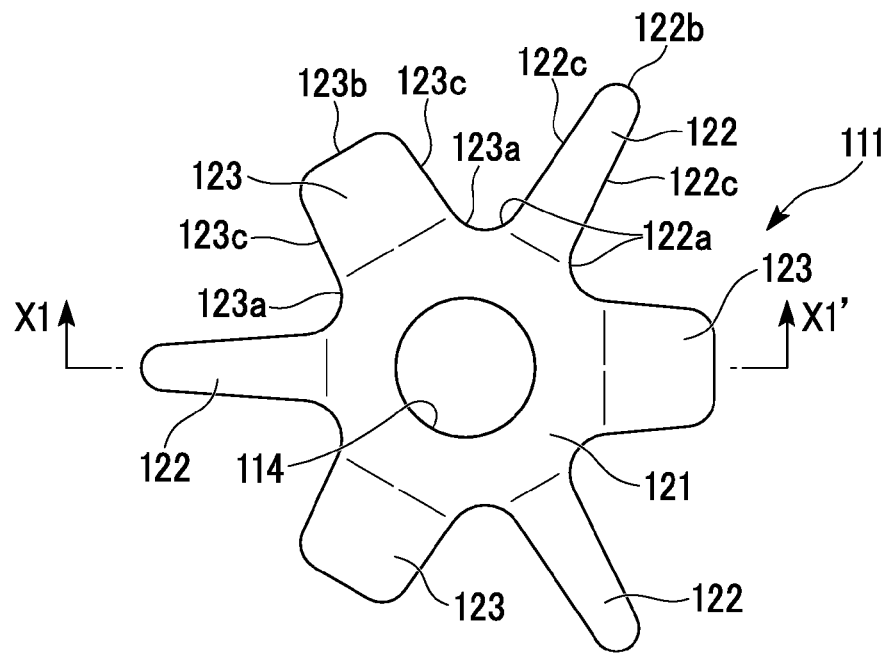
FIG. 3A is a plan view of a spring member of the shock absorber which is the cylinder apparatus according to the first embodiment of the present invention.
Figure 3B:
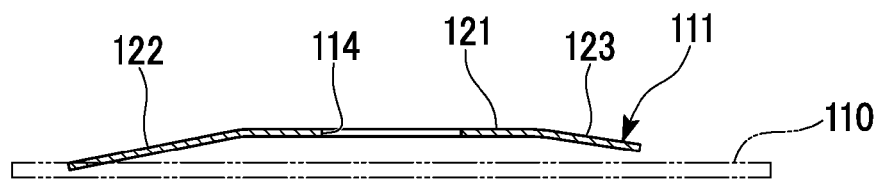
FIG. 3B is a cross-sectional view taken along line X1-X1' of FIG. 3A.
Figure 4:
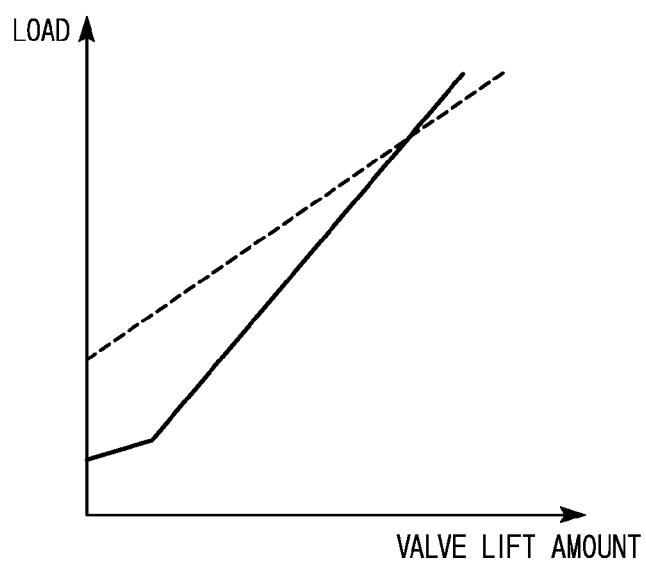
FIG. 4 is a characteristic diagram of the shock absorber which is the first embodiment of the cylinder apparatus according to the present embodiment and a shock absorber of the related art.

Furthermore, as shown in FIG. 3A, the elastic leg 122 has two proximal end edge sections 122a positioned at both sides of the base 121 in the circumferential direction at the proximal end side thereof, one tip edge section 122b of the tip side, and two side edge sections 122c positioned at both sides of the base 121 in the circumferential direction so as to connect the proximal end edge section 122a and the tip edge section 122b.

Both of the proximal end edge sections 122a are connected to a proximal end edge section 123a, which will be described later, of the elastic legs 123 adjacent to each other, and forms a arc-shape dented toward the base 121 side by the proximal end edge section 123a. Both edge sections 122c are tilted toward a line passing through the center of the base 121 and the center of the elastic leg 122 and extend in a straight line shape so as to approach each other by the extended tip side. The tip edge section 122b forms an arc shape projected to the tip side. Thus, the elastic leg 122 forms a tapered shape as a whole.

The elastic leg 123 forms the flat plate shape when in the natural state. When viewed from the radial direction of the base 121, as shown in FIG. 3B, the elastic leg 123 extends in a tilted shape at an obtuse angle so as to be positioned at the same one side as that of the elastic leg 122 in the axial direction outward from the base 121 in the radial direction. An angle formed between the elastic leg 123 and the base 121 is the same as an angle formed between the elastic leg 122 and the base 121. A length of which the elastic leg 123 extends from the base 121 is shorter than a length of which the elastic leg 122 extends from the base 121. Thus, a projected height of the elastic leg 123 from the base 121 in the axial direction of the base 121 is lower than a projected height of the elastic leg 122 from the base 121.

Herein, when the spring member 111 is in the natural state, an amount of projection thereof from the base 121 in the axial direction of the base 121 is set to be less in the elastic leg 123 and greater in the elastic leg 122 with respect to a value to be mentioned below. The value is in which a plate thickness of the disk valve 110 is subtracted from a difference in height between the guide boss section 84 of the base valve member 76 shown in FIG. 2, and the internal sheet section 85 and the external sheet section 86.

Furthermore, as shown in FIG. 3A, the elastic leg 123 has two proximal end edge sections 123a positioned at both sides of the base 121 in the circumferential direction at the proximal end side, one tip edge section 123b of the tip side, and two side edge sections 123c positioned at both sides of the base 121 in the circumferential direction so as to connect the proximal end edge section 123a and the tip edge section 123b. Both proximal end edge sections 123a are connected to the proximal end edge sections 122a of the elastic legs 122 adjacent to each other, and form an arc shape dented toward the base 121 by the proximal end edge sections 122a. Both edge sections 123c are tilted toward the line passing through the center of the base 121 and the center of the elastic leg 123 at the same angle so as to approach each other by the extended tip side, and extend in a straight line shape. The tip edge section 123b forms a straight line shape except for both corner sections, and both corner sections form arc shapes. Thus, the elastic leg 123 also forms a tapered shape as a whole.

A width of the elastic leg 123 in the circumferential direction of the base 121 is greater than a width of the elastic leg 122 in the circumferential direction of the base 121. Specifically, a minimum value of the width between both edge sections 123c is greater than a maximum value of the width between both edge sections 122c.

From the above, the spring member 111 constituted by one plate-like spring is configured so that the elastic leg 122 and the elastic leg 123 have the same flexural angle (that is, a flexural angle toward the disk valve 110 shown in FIG. 3B) with respect to the base 121, and the length of the elastic leg 122 is greater than that of the elastic leg 123. That is, a plurality of elastic legs 122 having a narrow width and a long length and a plurality of elastic legs 123 having a wide width and a short length extend at the same angle with the base 121. In addition, since the elastic leg 123 has a width greater than that of the elastic leg 122, the elastic leg 123 has a spring constant greater than that of the elastic leg 122. Specifically, the spring member 111 is formed in the shape mentioned above by punching and bending one plate such as a metal plate formed of spring steel using a press molder.

As shown in FIG. 2, the plate-like spring member 111 is placed between the valve restricting member 112, the base valve member 76 and the disk valve 110 in a direction in which the elastic legs 122 and 123 extend from the base 121 to the disk valve 110 side. The spring member 111 is clamped to the base 121 by the guide boss section 84 of the base valve member 76 and the valve restricting member 112. Thus, from the height relationship mentioned above, all of the plurality of elastic legs 122 having the narrow width and the long length come into contact with the disk valve 110 in the closed state closing the flow path 95 coming into contact with the internal sheet section 85 and the external sheet section 86 and are deformed. Furthermore, all of the plurality of elastic legs 123 having the wide width and the short length do not come into contact with the disk valve 110 and are not deformed. At this time, the elastic leg 122 comes into contact with a position between the internal sheet section 85 and the external sheet section 86 at the outside of the cutout section 116 in the radial direction of the disk valve 110. In addition, in FIG. 3B, with respect to the spring member 111 in the natural state, the disk valve 110 in the position in which the valve is closed is indicated by a two-dot chain line. From FIG. 3B, it is also understood that the elastic leg 122 comes into contact with the disk valve 110 in the closed state.

Here, as mentioned above, in the elastic leg 122, the spring constant is set to be small. More specifically, even when deformed, the elastic leg 122 generates a minimum biasing force required to cause the disk valve 110 to come into contact with the internal sheet section 85 and the external sheet section 86. For this reason, when pressure of the lower chamber 19 is equal to or greater than that of the reservoir chamber 14, the disk valve 110 can reliably close the flow path 95 by a biasing force by the elastic leg 122. Meanwhile, when pressure of the lower chamber 19 is lower than that of the reservoir chamber 14, the disk valve 110 moves away from the internal sheet section 85 and the external sheet section 86 while pressing the easily deformable elastic leg 122, and instantly opens the flow path 95. Thereafter, in addition, the disk valve 110 is further lifted, comes into contact with the elastic leg 123, presses and deforms the elastic leg 123, and further opens the flow path 95. At this time, the elastic leg 123 comes into contact with the position corresponds substantially to the internal sheet section 85 at the outside of the cutout section 116 in the radial direction of the disk valve 110. Although the elastic leg 123 has a spring constant set to be greater than that of the elastic leg 122, the elastic leg 123 does not provide substantial resistance to the opening of the flow path 95 by the disk valve 110. In this manner, the disk valve 110 itself is a check valve that does not generate a substantial damping force. More specifically, the disk valve 111 is a check valve in which the valve is opened when a piston speed is equal to or less than at least 0.05 m/s.

The plate-like spring member 111 mentioned above has a plurality of elastic legs 122 and elastic legs 123 that are bent toward the disk valve 110 in the circumferential direction. Some of the plurality of elastic legs 122 come into contact with the disk valve 110 in a state in which the disk valve 110 closes the flow path 95. Some of the plurality of elastic legs 123 do not come into contact with the disk valve 110 in the state in which the disk valve 110 closes the flow path 95. When the disk valve 110 is moved and separated from the external sheet section 86 to open the flow path 95, the elastic leg 123 comes into contact with the disk valve 110.

In the shock absorber that is the cylinder apparatus of the first embodiment, when the rod 22 is moved to the cylinder 11 to the extension side together with the piston 17, an amount of hydraulic fluid not only in the upper chamber 18 but also in the lower chamber 19 reduces to the extent that the rod 22 is projected from the cylinder 11. Then, pressure of the lower chamber 19 becomes lower than that of the reservoir chamber 14. However, since the disk valve 110 is simply pressed by the elastic leg 122 having a small spring constant of the spring member 111, the disk valve 110 is instantly separated from the external sheet section 86 and the internal sheet section 85 to open the flow path 95, and supplies liquid from the reservoir chamber 14 to the lower chamber 19.

Moreover, thereafter, the disk valve 110 comes into contact with and deforms the elastic leg 123 of the spring member 111. Herein, although the elastic leg 123 has a spring constant greater than that of the elastic leg 122, since the spring constant is low, the elastic leg 123 does not provide resistance to the opening of the disk valve 110, and the disk valve 110 itself does not generate a substantial damping force. However, when the stroke is switched to the compression stroke, liquid overflows due to the fact that the rod 22 enters the cylinder 11, and pressure of the lower chamber 19 is equal to or greater than that of the reservoir chamber 14, compared to a case in which pressure is applied only by the elastic leg 122, the disk valve 110 rapidly comes into contact with the external sheet section 86 and the internal sheet section 85 by a biasing force of the elastic leg 123 to close the flow path 95. That is, the disk valve 110 has a structure that performs rapid opening and closing by the spring member 111, and suppresses discontinuity of a damping force in the shock absorber. Accordingly, the shock absorber is able to present smooth damping force properties.

The shock absorber described in Japanese Unexamined Utility Model Application, First Publication No. H4-34566 mentioned above is constituted to press the disk valve which is the check valve by the spring member so as to seat the disk valve on the seat section. In such a shock absorber, in order to smooth the damping force waveform, properties of the disk valve pressed by the spring member should be linear properties. However, when the linear characteristics are focused on, the disk valve may be unnecessarily operated and there is a possibility that the disk valve may not perform an original function. That is, since disturbance of the damping force waveform (damping force characteristics become discontinuous) occurs, an abnormal noise is generated and thus such a case is not preferable. When designing in consideration of unevenness of an arrangement space of the spring member and unevenness of the spring member itself, as shown by a broken line in FIG. 4, an initial load of the spring member is high when an amount of lift of the disk valve 110 is 0, which disturbs the opening of the disk valve. (When the initial load is low, since the spring member may not come into contact with the disk valve 110 due to unevenness when closing the valve 110, there is a need to increase the initial load to a certain extent.)

On the other hand, according to the shock absorber which is the cylinder apparatus of the first embodiment, the spring member 111 includes the elastic leg 122 and the elastic leg 123. The elastic leg 122 comes into contact with the disk valve 110 in a closed state in which the disk valve 110 comes into contact with the internal sheet section 85 and the external sheet section 86 to close the flow path 95. The elastic leg 123 does not come into contact with the disk valve 110 in the closed state, and comes into contact with the disk valve 110 in an open state in which the disk valve 110 is separated from the external sheet section 86 to open the flow path 95. Accordingly, as indicated by a solid line in FIG. 4, the initial load of the spring member 111 is reliably generated so as not to be 0 although the initial load is suppressed by some elastic legs 122 to a lower value. Moreover, the required spring constant is generated by other elastic legs 123. Such an elastic leg 123 is suspended so as not to come into contact with the disk valve 110 in order to prevent generating the initial load in consideration of unevenness in the valve-closed state. Thus, the disk valve 110 may be easily opened when necessary while preventing the movement when unnecessary, and it is possible to prevent the closing delay after the stroke inversion by generating the required spring constant after opening the valve. In this manner, optimization of the valve properties may be promoted. As a consequence, when providing the shock absorber in a suspension device for a vehicle, running stability and riding comfort may be improved.

Furthermore, the spring member 111 is a plate-like spring. Among the plurality of elastic legs 122 and 123 provided in the circumferential direction of the spring member 111, some elastic legs 122 come into contact with the disk valve 110 of the closed state, and other elastic legs 123 come into contact with the disk valve 110 in the opened state. For this reason, optimization of valve properties can be promoted by a simple structure.

Furthermore, the spring member 111 is one plate-like spring. The plurality of elastic legs 122 and the plurality of elastic legs 123 included in the spring member 111 form identical flexural angles toward the disk valve 110, and the plurality of elastic legs 122 are longer than the plurality of elastic legs 123. For this reason, the flexural forming of the plurality of elastic legs 122 and the plurality of elastic legs 123 is facilitated, and the angle may be formed more accurately.

Furthermore, in order to increase the spring constant of the plurality of elastic legs 123 compared to the plurality of elastic legs 122, the necessary spring constant may be generated while suppressing the initial load of the spring member 111 to a low value.

Furthermore, in order to increase width of the plurality of elastic legs 123 compared to the plurality of elastic legs 122 to increase the spring constant, the manufacturing for obtaining different spring constant is facilitated, and thus the manufacturing cost may be reduced.

Furthermore, the base valve member 76 having the flow path 95 opened and closed by the disk valve 110 constitutes the base valve 71. For this reason, optimization of valve properties of the base valve 71 can be promoted.

Furthermore, the spring member 111 is clamped to the base valve member 76. For this reason, the position of the spring member 111 may be stabilized, and thus the plurality of elastic legs 122 may preferably come into contact with the disk valve 110 of the closed state and the plurality of elastic legs 123 may preferably come into contact with the disk valve 110 of the open state without bringing the plurality of elastic legs 123 into contact with the disk valve 110 of the closed state.

Furthermore, since the inner periphery and the outer periphery of the disk valve 110 are lifted with respect to the base valve member 76, the valve opening resistance of the disk valve 110 itself may be lowered, and thus the disk valve 110 may be opened more easily.

Furthermore, since the disk valve 110 is a check valve in which the valve is opened when the piston speed is equal to or less than at least 0.05 m/s, there is a high effect of more easily opening the disk valve 110.

Furthermore, since the disk valve 110 is a check valve which does not generate a substantial damping force, there is a high effect of more easily opening the disk valve 110.

Second Embodiment

Next, portions of a second embodiment different from the first embodiment will be described mainly based on FIGS. 5A, 5B, and 5C. In addition, the portions common to the first embodiment are indicated by the same names and same reference numerals.

Figure 5A:
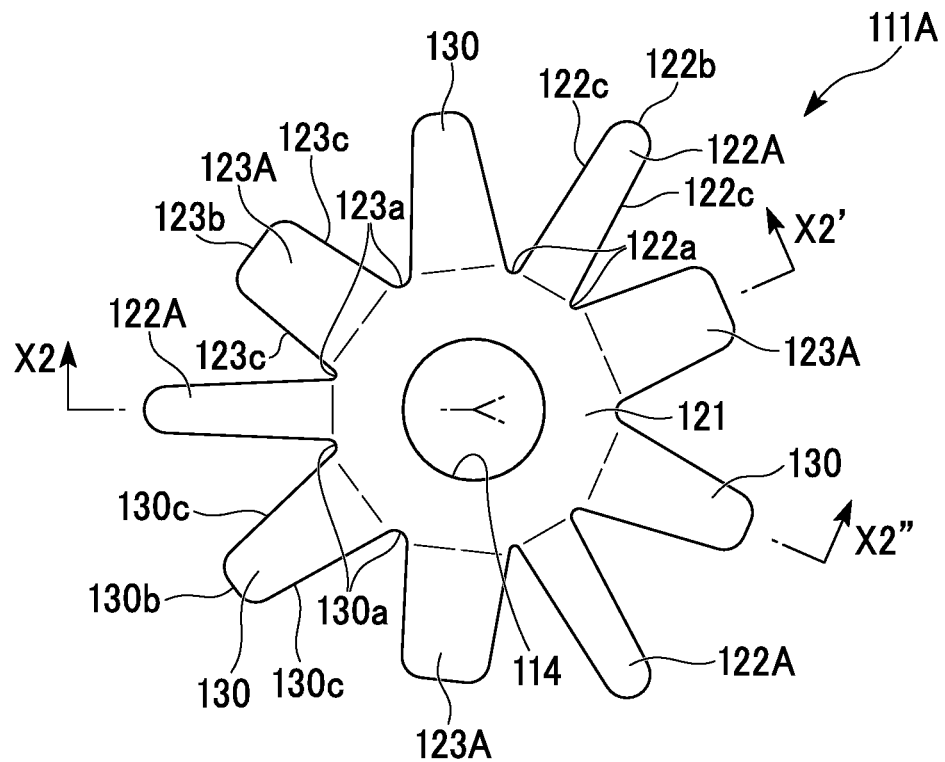
FIG. 5A is a plan view of a spring member of a shock absorber which is a cylinder apparatus according to a second embodiment of the present invention.
Figure 5B:
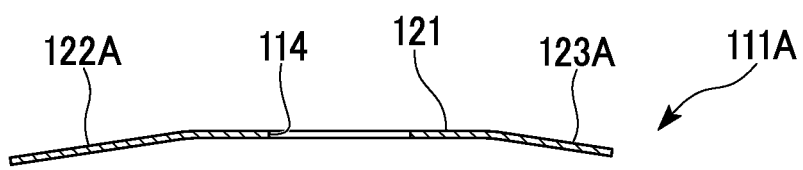
FIG. 5B is a cross-sectional view taken along line X2-X2' of FIG. 5A.
Figure 5C:
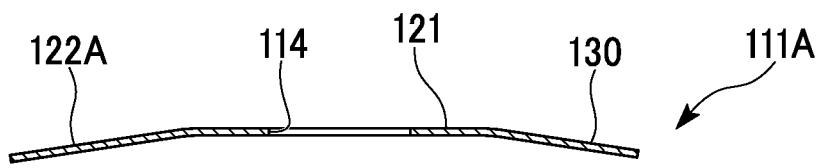
FIG. 5C is a cross-sectional view taken along line X2-X2" of FIG. 5A.

As shown in FIGS. 5A, 5B and 5C, in the second embodiment, a spring member 111A slightly modified from the first embodiment is used. The spring member 111A has a base 121 as in the first embodiment, an elastic leg (a first spring) 122A slightly modified from the elastic leg 122 of the first embodiment, an elastic leg (a second spring) 123A slightly modified from the elastic leg 123 of the first embodiment, and a plurality of elastic legs (a second spring) 130 different from the first embodiment. Specifically, as in each of the elastic leg 122A and the elastic leg 123A, three elastic legs 130 are formed in a circumferential direction in the outer peripheral portion of the base 121 at equal pitches. That is, the elastic leg 122A, the elastic leg 123A and the elastic legs 130 are sequentially placed on the base 121, that is, the spring member 111, in the circumferential direction.

The width of the elastic leg 122A in the circumferential direction of the base 121 is narrowed to the extent that the elastic leg 130 is added. The elastic leg 122A has the same shape as the elastic leg 122 of the first embodiment except for the point that an arc-shaped proximal end edge section 122a is decreased. The width of the elastic leg 123A in the circumferential direction of the base 121 is also narrowed to the extent that the elastic leg 130 is added. The elastic leg 123A has the same shape as the elastic leg 123 of the second embodiment except for the point that the arc-shaped proximal end edge section 123a is decreased.

The elastic leg 130 forms a flat plate shape in the natural state. As shown in FIG. 5C, when viewed from the radial direction of the base 121, the elastic leg 130 extends in a sloped shape at an obtuse angle so as to be located on the same one side as the elastic leg 122A in the axial direction outward from the base 121 in the radial direction. The elastic leg 130 forms the same angle with the base 121 as the elastic leg 122A. As shown in FIG. 5B, since the angles formed between the elastic legs 122A and 123A and the base 121 are the same, the angle formed by the elastic leg 130 with the base 121 is the same as that of the elastic leg 123A.

As shown in FIG. 5A, the length of which the elastic leg 130 extends from the base 121 is shorter than that of the elastic leg 122A and is greater than that of the elastic leg 123A. Since the angles of the elastic legs 122A, 123A and 130 with the base 121 are the same, the elastic leg 130 is configured so that an amount of projection thereof from the base 121 in the axial direction of the base 121 is smaller than that of the elastic leg 122A and is greater than that of the elastic leg 123A.

Herein, when the elastic leg 130 is in the natural state, with respect to a value to be mentioned below, the amount of projection from the base 121 in the axial direction of the base 121 becomes smaller. The value is in which the plate thickness of the disk valve 110 is subtracted from the difference in height between the guide boss section 84 of the base valve member 76 shown in FIG. 2, and the internal sheet section 85 and the external sheet section 86.

As shown in FIG. 5A, the elastic leg 130 has two proximal end edge sections 130a located at both sides of the base 121 in the circumferential direction at the proximal end side thereof, one tip edge section 130b of the tip side, and two side edge sections 130c located at both sides of the base 121 in the circumferential direction so as to connect the proximal end edge sections 130a and the tip edge section 130b.

One of the proximal end edge sections 130a of the elastic leg 130 is connected to a proximal end edge section 122a of the elastic legs 122A adjacent to each other, and forms a arc-shape dented toward the base 121 side by the proximal end edge section 122a. Furthermore, the other of the proximal end edge sections 130a is connected to a proximal end edge section 123a of the elastic legs 123A adjacent to each other, and forms a arc-shape dented toward the base 121 side by the proximal end edge section 123a. Both side edge sections 130c are tilted toward a line passing through the center of the base 121 and the center of the elastic leg 130 and extend in a straight line shape so as to approach each other by the extended tip side. The tip edge section 130b forms a straight line shape except for the both corner sections, and both of the corner sections form an arc shape. Thus, the elastic leg 130 also forms a tapered shape as a whole. The width of the elastic leg 130 in the circumferential direction of the base 121 is greater than the width of the elastic leg 122A and is narrower than the width of the elastic leg 123A. Specifically, the width of the elastic leg 130 is set so that a minimum value of the width between both edge sections 130c is greater than a maximum value of the width of the elastic leg 122A, and a maximum value between both edge sections 130c is smaller than a minimum value of the width of the elastic leg 123A.

From the above, in the spring member 111A constituted by one plate-like spring, the elastic leg 122A, the elastic leg 123A and the elastic leg 130 have the same flexural angle (that is, the flexural angle toward the disk valve 110) with the base 121, the lengths of the elastic legs 122A and 130 are greater than the length of the elastic leg 123A, and the length of the elastic leg 122A is greater than that of the elastic leg 130. That is, the plurality of elastic legs 122A having the narrow width and the long length, the elastic leg 130 having the middle width and the middle length, and the plurality of elastic legs 123A having the large width and the short length are tilted and extend at the same angle with respect to the base 121 sequentially in the circumferential direction. In addition, since the elastic leg 130 has a width greater than that of the elastic leg 122A, the elastic leg 130 has a spring constant greater than that of the elastic leg 122A, and the elastic leg 130 has a width smaller than that of the elastic leg 123A, the elastic leg 130 has a spring constant smaller than that of the elastic leg 123A.

Such a plate-like spring member 111A is placed in a direction in which the elastic legs 122A, 123A and 130 extend from the base 121 to the disk valve 110 side. The spring member 111A is clamped by the base valve member 76 and the valve restricting member 112. Then, from the height relationship mentioned above, all of the plurality of elastic legs 122A having the narrow width and the long length come into contact with the disk valve 110 in the closed state and are deformed, and all of the plurality of elastic legs 130 having the middle width and the middle length and all of the plurality of elastic legs 123A having the large width and the short length do not come into contact with the disk valve 110 in the closed state and are not deformed.

According to the shock absorber which is the cylinder apparatus of the second embodiment mentioned above, since the spring member 111A has the elastic leg 122A coming into contact with the disk valve 110 and the plurality of types of elastic legs 123A and elastic legs 130 not coming into contact with the disk valve 110 and having different distances with respect to the disk valve 110, further optimization of valve properties may be promoted.

In addition, in the second embodiment, four types of elastic legs or more having different extension lengths may be formed without being limited to the three types of elastic legs 122A, 123A, and 130.

Third Embodiment

Next, portions of a third embodiment different from the first embodiment will be described mainly based on FIGS. 6A and 6B. In addition, the portions common to the first embodiment are indicated by the same names and same reference numerals.

Figure 6A:
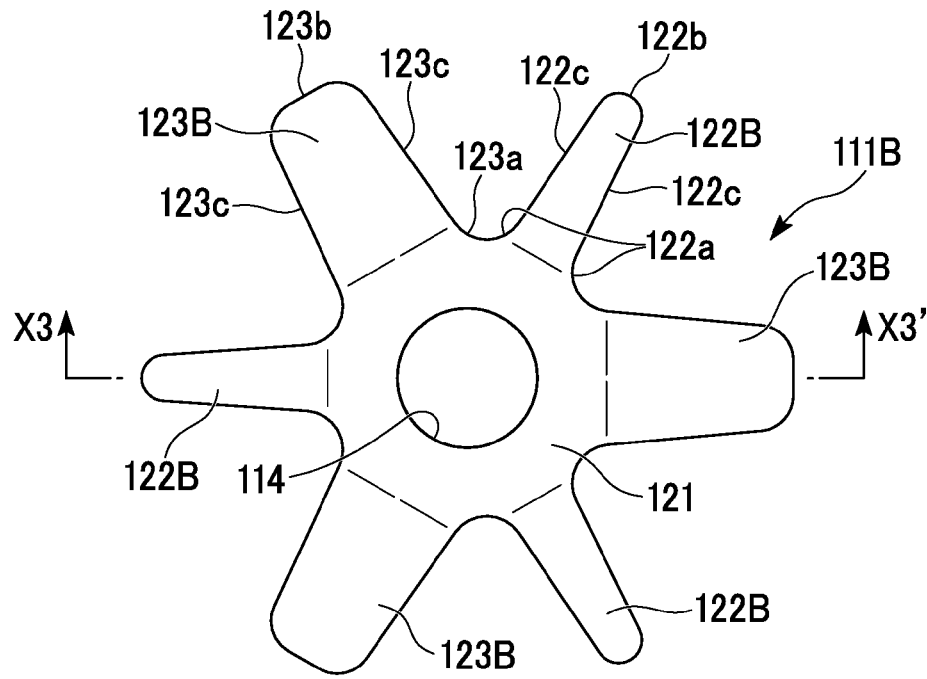
FIG. 6A is a plan view of a spring member of a shock absorber which is a cylinder apparatus according to a third embodiment of the present invention.
Figure 6B:
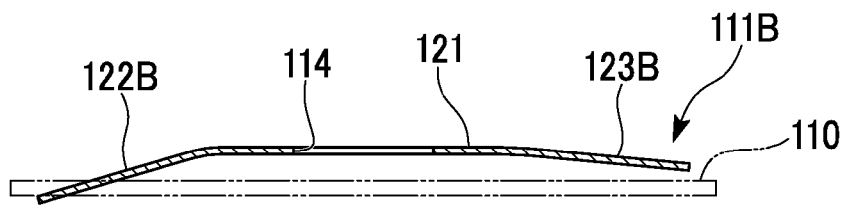
FIG. 6B is a cross-sectional view taken along line X3-X3' of FIG. 6A.

As shown in FIGS. 6A and 6B, in the third embodiment, a spring member 111B slightly modified from the first embodiment is used. The spring member 111B has a base 121 as in the first embodiment, an elastic leg (a first spring) 122B slightly modified from the elastic leg 122 of the first embodiment, and an elastic leg (a second spring) 123B slightly modified from the elastic leg 123 of the first embodiment As shown in FIG. 6B, lengths to which the elastic leg 122B and the elastic leg 123B extend from the base 121 are the same. An angle formed by the elastic leg 122B with respect to the base 121 is smaller than that of the elastic leg 123B. In other words, the flexural angle of the elastic leg 122B toward the disk valve 110 is greater than that of the elastic leg 123B. Accordingly, an amount of projection of the elastic leg 122B from the base 121 in the axial direction of the base 121 is greater than that of the elastic leg 123B.

Here, when the spring member 111B is in the natural state, the amount of projection from the base 121 in the axial direction of the base 121 is set to be less for the elastic leg 123B and greater for the elastic leg 122B with respect to a value to be mentioned below. The value is in which the plate thickness of the disk valve 110 is subtracted from the difference in height between the guide boss section 84 of the base valve member 76 shown in FIG. 2, and the internal sheet section 85 and the external sheet section 86.

From the above, in the spring member 111B constituted by one plate-like spring, the lengths to which the elastic leg 122B and the elastic leg 123B extend from the base 121 are the same. The flexural angle of the spring member 111B toward the disk valve 110 is greater in the elastic leg 122B than in the elastic leg 123B. That is, the plurality of elastic legs 122B having the narrow width and the great flexural angle and the plurality of elastic legs 123B having the great width and the small flexural angle extend from the base 121 circumferentially and alternately by the same length.

Such a plate-like spring member 111B is placed in a direction in which the elastic legs 122B and 123B extend from the base 121 to the disk valve 110 side. The spring member 111B is clamped by the base valve member 76 and the valve restricting member 112. Then, from the height relationship mentioned above, all of the plurality of elastic legs 122B having the narrow width and the great flexural angle come into contact with the disk valve 110 of the closed state and are deformed, and all of the plurality of elastic legs 123B having the great width and the small flexural angle do not come into contact with the disk valve 110 of the closed state and are not deformed. In addition, a two-dot chain line in FIG. 6B shows the disk valve 110 in the closed position with respect to the spring member 111B that is in the natural state.

According to the shock absorber which is the cylinder apparatus of the third embodiment mentioned above, since the spring member 111B constituted by one plate-like spring is configured so that the lengths to which the elastic leg 122B and the elastic leg 123B extend from the base 121 are the same, the flexural angle toward the disk valve 110 is greater in the elastic leg 122B than in the elastic legs 123B. For this reason, the portion remaining in the material plate at the time of punching may be reduced, and thus the material plate may be effectively used.

In addition, in the third embodiment, the spring member 111B may be formed of the elastic legs having different angles of three or more types by increasing the types as in the second embodiment to the first embodiment rather than two types of elastic legs 122B and 123B. Furthermore, in the third embodiment, in addition to the flexural angles of the elastic leg 122B and the elastic leg 123B with respect to the base 121, as in the first embodiment, the lengths to which the elastic leg 122B and the elastic leg 123B extend from the base 121 may be different.

Fourth Embodiment

Next, portions of a fourth embodiment different from those of the first embodiment will be described mainly based on FIG. 7. In addition, the portions common to those of the first embodiment are indicated by the same names and the same reference numerals.

Figure 7:
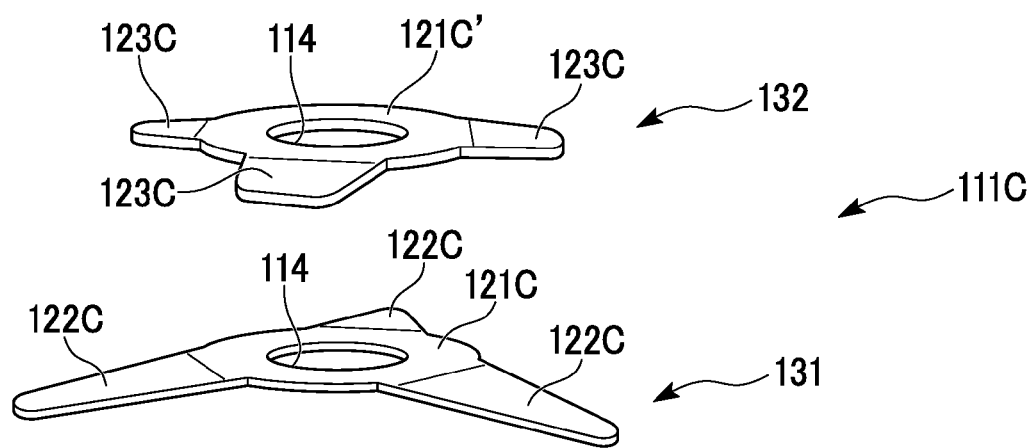
FIG. 7 is an exploded perspective view showing a spring member of a shock absorber which is a cylinder apparatus according to a fourth embodiment of the present invention.

In the fourth embodiment, as shown in FIG. 7, a spring member 111C different from the first embodiment is used. The spring member 111C is constituted by a first constituent (a first spring) 131 and a second constituent (a second spring) 132. The first constituent 131 is configured so that only an elastic leg 122C slightly modified from the elastic body 122 of the first embodiment extends from the outer peripheral portion of the same base 121C as the base 121 of the first embodiment. The second constituent 132 is configured so that only an elastic leg 123C slightly modified from the elastic body 123 of the first embodiment extends from the outer peripheral portion of the same base 121C' as the base 121 of the first embodiment.

The widths of the elastic leg 122C and the elastic leg 123C are substantially the same. Moreover, the plate thickness of the first constituent 131 is thinner than that of the second constituent 132. Accordingly, the spring constant of the elastic leg 122C is configured so as to be smaller than that of the elastic leg 123C.

Moreover, the spring member 111C is configured so that the first constituent 131 and the second constituent 132 overlap as below. That is, a direction in which the elastic leg 122C is bent with respect to the base 121C is the same as a direction in which the elastic leg 123C is bent with respect to the base 121C'. The first constituent 131 is placed at the bent side of the elastic leg 123C to the base 121C' of the second constituent 132. Moreover, the bases 121C and 121C' overlap. Here, the elastic leg 122C and the elastic leg 123C alternate in the circumferential direction of the bases 121C and 121C', that is, the spring member 111C, and the phase is matched so that the elastic leg 122C is centered between two elastic legs 123C adjacent to each other, and the elastic leg 123C is centered between two elastic legs 122C adjacent to each other.

Accordingly, the first constituent 131 formed of the plate-like spring including the plurality of elastic legs 122C bent toward the disk valve 110 (see FIG. 2) in the circumferential direction, and the second constituent 132 formed of the plate-like spring including the plurality of elastic legs 123C bent toward the disk valve 110 in the circumferential direction overlap to from the spring member 111C.

In the state in which the first constituent 131 and the second constituent 132 overlap, the amount of projection of the elastic leg 123C of the second constituent 132 from the base 121C of the first constituent 131 in the axial direction of the bases 121C and 121C' is set to be smaller than the amount of projection of the elastic leg 122C of the first constituent 131 from the base 121C.

Here, when the spring member 111C is in the natural state, the amount of projection from the base 121 in the axial direction of the base 121C and 121C' is set to be less for the elastic leg 123C and greater for the elastic leg 122C with respect to a value to be mentioned below. The value is in which the plate thickness of the disk valve 110 is subtracted from the difference in height between the guide boss section 84 of the base valve member 76 shown in FIG. 2, and the internal sheet section 85 and the external sheet section 86.

Moreover, as shown in FIG. 7, the flexural angle of the elastic leg 122C with respect to the base 121C and the flexural angle of the elastic leg 123C with respect to the base 121C' are set to be the same so that the amount of projection from the base 121C becomes the set amount mentioned above, the length of which the elastic leg 122C extends from the base 121C is long, and the length of which the elastic leg 123C extends from the base 121C' is short.

In addition, in this case, since the base 121C serving as the proximal end of the elastic leg 122C and the base 121C' serving as the proximal end of the elastic leg 123C deviate from each other in the axial direction, it is also possible to make the flexural angles and the extension lengths of the elastic leg 122C and the elastic leg 123C identical. Otherwise, it is also possible to make the extension lengths of the elastic leg 122C and the elastic leg 123C identical and the flexural angles thereof different, or make both the extension lengths and the flexural angles different.

The spring member 111C including the two first constituent 131 and second constituent 132 overlaps so as to obtain the set phase mentioned above, and in the posture in which the elastic legs 122C and 123C extend from the base 121C to the disk valve 110 side, the spring member 111C is clamped by the base valve member 76 and the valve restricting member 112. Then, from the height relationship mentioned above, all of the plurality of elastic legs 122C of the first constituent 131 come into contact with the disk valve 110 of the closed state and are deformed, and all of the plurality of the elastic legs 123C of the second constituent 132 do not come into contact with the disk valve 110 and are not deformed.

According to the shock absorber which is the cylinder apparatus of the fourth embodiment mentioned above, the spring member 111C is constituted by overlapping the first constituent 131 and the second constituent 132. The first constituent 131 is a plate-like spring that includes the plurality of elastic legs 122C in the circumferential direction. The second constituent 132 is a plate-like spring that includes the plurality of elastic legs 123C in the circumferential direction. For this reason, the plate thickness may be individually changed or the material may be changed. Thus, as mentioned above, the second constituent 132 having a great thickness and high spring constant may be used, and thus further optimization of valve properties may be promoted.

In addition, in the fourth embodiment, the spring member may be configured by three or more constituents each having the elastic legs rather than two first and second constituents 131 and 132.

Figure 8:
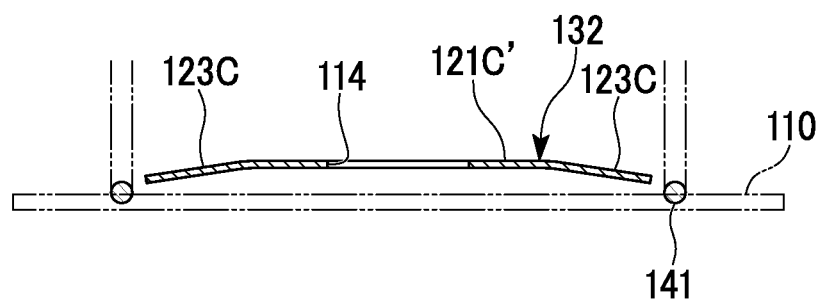
FIG. 8 is a side cross-sectional view showing a modified example of the spring member of the shock absorber which is the cylinder apparatus according to the fourth embodiment of the present invention.

In addition, as shown in FIG. 8, the first constituent, which comes into contact with the disk valve 110 in the closed state and is deformed, is constituted by the coil spring (first spring) 141, and the first constituent may be combined with the second constituent 132 which is a plate-like spring including the plurality of elastic legs 123C bent toward the disk valve 110 in the circumferential direction as mentioned above. With such a configuration, valve properties may be individually changed. In addition, a two-dot chain line in FIG. 8 shows the disk valve 110 which is closed by the coil spring 141 in the natural state.

The spring member described in the first to fourth embodiments mentioned above may also be applied to the spring member 57 of the piston 17 fastened to the other end of the rod 22 shown in FIG. 1. That is, the configurations of the spring members 111, 111A, 111B, and 111C described in the first to fourth embodiments mentioned above may be applied to the spring member 57 which axially presses the disk valve 55 opening and closing the flow path 46 provided in the piston valve member 31. With such a configuration, optimization of valve properties of the piston 17 may be promoted.

According to the embodiments mentioned above, the cylinder apparatus includes a cylinder in which a fluid is enclosed, a valve member which is fitted in the cylinder and divides the inside of the cylinder into at least two chambers, a rod, an end of which extends to the outside of the cylinder, a flow path which is provided in the valve member and through which the fluid circulates when the rod is moved, a disk valve which opens and closes the flow path, and a spring member which axially presses the valve. The spring member includes a first spring which comes into contact with the disk valve in a state in which the disk valve closes the flow path, and a second spring which comes into contact with the disk valve in a state in which the disk valve opens the flow path. Accordingly, the initial load of the spring member may be generated so as not to be 0 although the initial load is suppressed by the first spring to a lower value. Moreover, the required spring constant is generated by the second spring. The second spring may suspend so as not to generate the initial load or not to come into contact with the disk valve in consideration of unevenness in the valve-closed state. Thus, the disk valve may be easily opened when necessary while preventing the movement when unnecessary, and it is possible to prevent the closing delay after the stroke inversion by generating the required spring constant after opening the valve. In this manner, optimization of the valve properties may be promoted Furthermore, the spring member is a plate-like spring which includes a plurality of elastic legs in a circumferential direction that are bent toward the disk valve. Some of the plurality of elastic legs constitutes the first spring, and others constitute the second spring. Accordingly, optimization of valve properties may be promoted by the simple structure.

Furthermore, the spring member is constituted by one plate-like spring. The first spring has a flexural angle toward the disk valve that is greater than that of the second spring. Accordingly, it is possible to reduce the portion remaining in the material plate at the time of punching, and thus the material plate may be effectively used.

Furthermore, the spring member is constituted by one plate-like spring. The first spring and the second spring have the same flexural angle toward the disk valve. A length of the first spring is greater than that of the second spring. Accordingly, the flexural forming of the first spring and the second spring is facilitated, and the angle may be formed more accurately.

Furthermore, the spring constant of the second spring may be greater than that of the first spring. Accordingly, the necessary spring constant may be generated while suppressing the initial load of the spring member to a low value.

Furthermore, the width of the second spring may be greater than that of the first spring. Accordingly, the manufacturing for obtaining another spring constant is facilitated, and thus the manufacturing cost may be reduced.

Furthermore, the first spring is constituted by a plate-like spring including a plurality of elastic legs in the circumferential direction that are bent toward the disk valve. The second spring is constituted by a plate-like spring including a plurality of elastic legs in the circumferential direction that are bent toward the disk valve. The spring member is constituted by overlapping the first spring and the second spring. Accordingly, the plate thickness or material of the first spring and the second spring may be individually changed. Thus, further optimization of valve properties may be promoted.

Furthermore, the first spring is constituted by a coil spring. The second spring is constituted by a plate-like spring including a plurality of elastic legs in the circumferential direction that are bent toward the disk valve. Accordingly, valve properties may be separately changed.

Furthermore, the valve member may constitute a piston that is fastened to the other end of the rod. Accordingly, optimization of valve properties of the piston may be promoted.

Furthermore, the valve member may constitute a base valve. Accordingly, optimization of valve properties of the base valve may be promoted.

Furthermore, the spring member may be clamped to the valve member. Accordingly, the position of the spring member may be stabilized, and thus the first spring may preferably come into contact with the disk valve in the closed state, and the second spring may preferably come into contact with the disk valve in the open state.

Furthermore, the disk valve may lift both on an inner periphery and an outer periphery thereof. Accordingly, the disk valve may be opened more easily.

Furthermore, the disk valve may be a check valve in which the valve is opened when a piston speed is equal to or less than at least 0.05 m/s. Accordingly, there is a high effect of more easily opening the disk valve.

Furthermore, the disk valve may be a check valve which does not generate a substantial damping force. Accordingly, there is a high effect of more easily opening the disk valve. In addition, although the present embodiment shows an example using the disk valve as the valve, a poppet valve or the like may be used without being limited thereto.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

The invention claimed is:

1. A cylinder apparatus comprising:
a cylinder in which a fluid is enclosed;
a valve member which is fitted in the cylinder and divides the inside of the cylinder into at least two chambers;
a rod, an end of which extends to the outside of the cylinder;
a flow path which is provided in the valve member and through which the fluid circulates when the rod is moved;
a valve which opens and closes the flow path; and
a spring member which presses the valve in an axial direction,
wherein the spring member comprises:
a first spring which comes into contact with the valve in a state in which the valve closes the flow path; and
a second spring which does not come into contact with the valve in the state in which the valve closes the flow path and comes into contact with the valve in a state in which the valve opens the flow path.

2. The cylinder apparatus according to claim 1, wherein the spring member is a plate-like spring which includes a plurality of elastic legs in a circumferential direction that are bent toward the valve, and
some of the plurality of elastic legs constitute the first spring, and others constitute the second spring.

3. The cylinder apparatus according to claim 2, wherein the spring member is constituted by one plate-like spring, and
the first spring has a flexural angle toward the valve that is greater than that of the second spring.

4. The cylinder apparatus according to claim 2, wherein the spring member is constituted by one plate-like spring, and the first spring and the second spring have the same flexural angle toward the valve, and a length of the first spring is greater than that of the second spring.

5. The cylinder apparatus according to claim 1, wherein a spring constant of the second spring is greater than that of the first spring.

6. The cylinder apparatus according to claim 5, wherein a width of the second spring is greater than that of the first spring.

7. The cylinder apparatus according to claim 1, wherein the first spring is constituted by a plate-like spring including a plurality of elastic legs in a circumferential direction that are bent toward the valve, the second spring is constituted by a plate-like spring including a plurality of elastic legs in the circumferential direction that are bent toward the valve, and the spring member is constituted by overlapping the first spring and the second spring.

8. The cylinder apparatus according to claim 1, wherein the first spring is constituted by a coil spring, and the second spring is constituted by a plate-like spring including a plurality of elastic legs in a circumferential direction that are bent toward the valve.

9. The cylinder apparatus according to claim 1, wherein the valve member constitutes a piston that is fastened to the other end of the rod.

10. The cylinder apparatus according to claim 1, wherein the valve member constitutes a base valve.

11. The cylinder apparatus according to claim 1, wherein the spring member is clamped to the valve member.

12. The cylinder apparatus according to claim 1, wherein both of an inner periphery and an outer periphery of the valve are lifted.

13. The cylinder apparatus according to claim 1, wherein the valve is a check valve that is opened when a piston speed is equal to or less than 0.05 m/s.

14. The cylinder apparatus according to claim 1, wherein the valve is a check valve which does not generate a substantial damping force.

15. The cylinder apparatus according to claim 1, wherein the valve is a disk valve.

* * * * *